(12) United States Patent
Correl et al.

(10) Patent No.: US 7,831,623 B2
(45) Date of Patent: *Nov. 9, 2010

(54) METHOD, SYSTEM, AND ARTICLE OF MANUFACTURE FOR STORING DEVICE INFORMATION

(75) Inventors: Stephen F. Correl, Beaverton, OR (US); James John Seeger, Portland, OR (US); Martine Bruce Wedlake, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 377 days.

This patent is subject to a terminal disclaimer.

(21) Appl. No.: 11/929,044

(22) Filed: Oct. 30, 2007

(65) Prior Publication Data

US 2008/0052296 A1     Feb. 28, 2008

Related U.S. Application Data

(63) Continuation of application No. 10/851,036, filed on May 21, 2004.

(51) Int. Cl.
*G06F 7/00* (2006.01)
(52) U.S. Cl. .................................................. 707/793
(58) Field of Classification Search .................. 707/793
See application file for complete search history.

(56) References Cited

U.S. PATENT DOCUMENTS

| | | | | |
|---|---|---|---|---|
| 6,119,131 A | * | 9/2000 | Cabrera et al. | 707/203 |
| 6,173,374 B1 | * | 1/2001 | Heil et al. | 711/148 |
| 6,260,120 B1 | * | 7/2001 | Blumenau et al. | 711/152 |
| 6,374,266 B1 | * | 4/2002 | Shnelvar | 707/204 |
| 6,457,098 B1 | * | 9/2002 | DeKoning et al. | 711/114 |
| 6,549,916 B1 | * | 4/2003 | Sedlar | 707/200 |
| 6,601,101 B1 | * | 7/2003 | Lee et al. | 709/227 |
| 6,671,727 B1 | * | 12/2003 | Odenwald | 709/227 |
| 6,944,620 B2 | * | 9/2005 | Cleraux et al. | 717/138 |
| 2002/0078335 A1 | * | 6/2002 | Cabrera et al. | 713/1 |
| 2002/0161596 A1 | * | 10/2002 | Johnson et al. | 705/1 |
| 2003/0188022 A1 | * | 10/2003 | Falkner | 709/246 |
| 2004/0088294 A1 | * | 5/2004 | Lerhaupt | 707/8 |
| 2005/0052296 A1 | * | 3/2005 | Manlove et al. | 341/110 |
| 2005/0114291 A1 | * | 5/2005 | Becker-Szendy et al. | 707/1 |

(Continued)

OTHER PUBLICATIONS

PCT Search Report, dated Feb. 16, 2006, for PCT/EP2005/052331, filed May 20, 2005, document only with parent U.S. Appl. No. 10/851,036.

(Continued)

*Primary Examiner*—Neveen Abel Jalil
*Assistant Examiner*—Christyann R Pulliam
(74) *Attorney, Agent, or Firm*—Rabindranath Dutta; Konrad Raynes and Victor LLP

(57) ABSTRACT

A method, system, and article of manufacture, wherein a plurality of references to a plurality of files corresponding to a plurality of devices are stored in a data structure implemented in a computational device, wherein the computational device is coupled to the plurality of devices via a network. Access is enabled to the data structure to a distributed application, wherein the distributed application uses a stored reference in the data structure to determine a file corresponding to a device, and wherein the distributed application performs data transfer operations with the device via the determined file.

12 Claims, 6 Drawing Sheets

U.S. PATENT DOCUMENTS

2005/0192932 A1* 9/2005 Kazar et al. .................. 707/1
2009/0119304 A1* 5/2009 Preslan et al. ................ 707/10

OTHER PUBLICATIONS

PCT Written Opinion, dated Feb. 16, 2006, for PCT/EP2005/052331, filed May 20, 2005, document only with parent U.S. Appl. No. 10/851,036.

J. Menon, et al., "IBM Storage Tank—A Heterogeneous Scalable SAN File System", IBM Corp., IBM Systems Journal, vol. 42, No. 2, 2003, pp. 250-267, document only with parent U.S. Appl. No. 10/851,036.

European Examination Report, Oct. 1, 2007, for European Application No. 05747896.8-1245 5 pp, document only with parent U.S. Appl. No. 10/851,036.

WordNet—critical. (n.d.). WordNet 3.0 Retrieved Apr. 4, 2008, from Dictionary.com website: http://dictionary.reference.com/browse/critical (hereinafter WordNet), document only with parent U.S. Appl. No. 10/851,036.

Information Disclosure Statement from China IP Law, dated Dec. 26, 2007, 1 pg, document only with parent U.S. Appl. No. 10/851,036.

* cited by examiner

METHOD, SYSTEM, AND ARTICLE OF MANUFACTURE FOR STORING DEVICE INFORMATION

CROSS-REFERENCE TO RELATED APPLICATIONS

This application is a continuation of application Ser. No. 10/851,036 filed on May 21, 2004 which is incorporated herein by reference in its entirety.

BACKGROUND

1. Field

The disclosure relates to a method, system, and article of manufacture for storing device information.

2. Background

A storage area network (SAN) is a special purpose network that interconnects a plurality of storage devices with associated data servers. In certain implementations, a SAN may be a high-speed subnetwork of shared storage devices. A storage device is a machine that may comprise a plurality of disks, tapes or other storage media for storing data.

A SAN may couple a plurality of hosts, where the hosts may be file servers, to a plurality of storage devices. In certain implementations, the SAN may be a storage network that is different from an Internet Protocol (IP) based network.

While a SAN may be clustered in proximity to other computing resources, such as, an IBM® z990 mainframe, certain SANs may also extend to remote locations for backup and archival storage by using WAN carrier technologies. SANs can use communication technologies, such as, IBM's optical fiber based Enterprise System Connection (ESCON®), the Fibre Channel technology, etc. SANs may support disk mirroring, backup and restore, archival and retrieval of data, data migration from one storage device to another, and the sharing of data among different servers in a network. Certain SANs may also incorporate subnetworks with network-attached storage (NAS) systems.

SUMMARY

Provided are a method, system, and article of manufacture, wherein a plurality of references to a plurality of files corresponding to a plurality of devices are stored in a data structure implemented in a computational device, wherein the computational device is coupled to the plurality of devices via a network. Access is enabled to the data structure to a distributed application, wherein the distributed application uses a stored reference in the data structure to determine a file corresponding to a device, and wherein the distributed application performs data transfer operations with the device via the determined file.

In certain embodiments, the data structure is a directory, wherein the files are device files, and wherein the references are soft links to the device files.

In certain additional embodiments, the data structure is a registry, wherein entries in the registry include the references.

In yet additional embodiments information is received, from another computational device, wherein the information is capable of being used to determine an additional reference that corresponds to an additional file corresponding to an additional device added to the network. The data structure is updated to include the additional reference.

In additional embodiments, an additional device that has been added to the network is discovered. A determination is made of an additional reference that corresponds to an additional file corresponding to the additional device. The data structure is updated to include the additional reference.

In further embodiments, the network is a storage area network, wherein the distributed application is capable of accessing the plurality of devices via a plurality of computational devices.

In yet additional embodiments, the computational device is a first computational device, wherein the data structure is a first data structure. A second data structure, implemented in a second computational device, stores at least one of the plurality of references to the plurality of files corresponding to the plurality of devices, wherein the second computational device is coupled to the plurality of devices via the network, and wherein the distributed application is capable of accessing the plurality of devices via the first and the second data structures.

In further embodiments, the data structure is capable of being implemented in a plurality of heterogeneous operating systems, and wherein the plurality of devices are heterogeneous.

In still further embodiments, the data structure in implemented locally in the computational device, and wherein the distributed application is capable of initiating the data transfer operations with the device faster by accessing the data structure implemented locally in the computational device in comparison to accessing the data structure implemented remotely from the computational device.

In additional embodiments, an operating system and drivers in the computational device are incapable of directly providing the distributed application with access to information to perform the data transfer operations with the device.

In further embodiments, the file is a device file, wherein the device is a virtual storage device, wherein the network is a storage area network, and wherein the device file represents a path to the virtual storage device through the storage area network.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
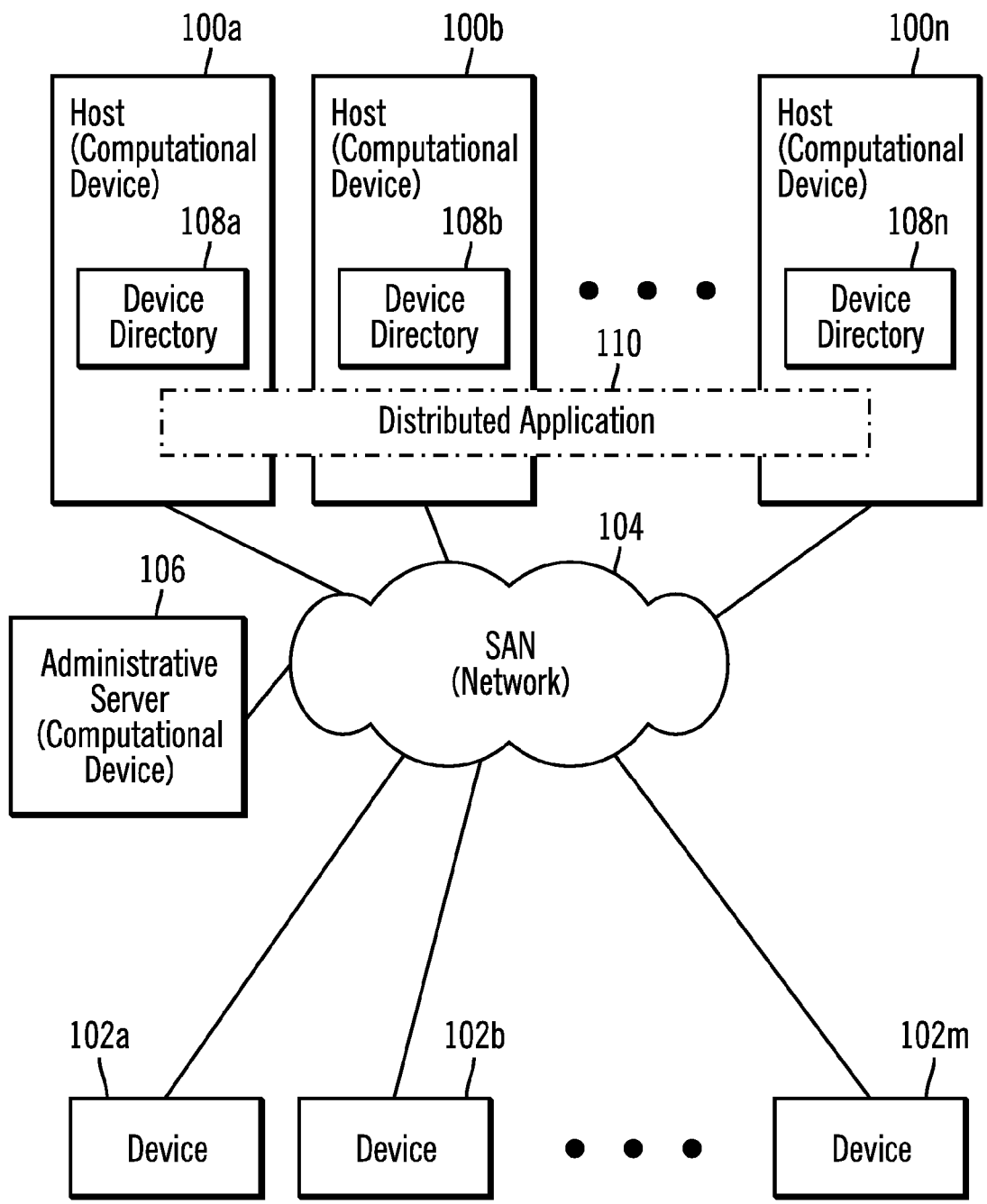
FIG. 1 illustrates a block diagram of a computing environment, in accordance with certain embodiments.

FIG. 1 illustrates a computing environment in which certain embodiments are implemented. A plurality of hosts 100a . . . 100n are coupled to a plurality of devices 102a . . . 102m over a network, such as, a SAN 104. In certain embodiments, an administrative server 106 that is capable of performing operations with respect to the hosts 100a . . . 100n and the devices 102a . . . 102m is also coupled to the SAN 104.

The plurality of hosts 100a . . . 100n and the administrative server 106 may comprise any type of computational device, such as, a workstation, a desktop computer, a laptop, a mainframe, a telephony device, a hand held computer, a server, a blade computer, etc. The plurality of hosts 100a . . . 100n may include a plurality of device directories 108a . . . 108n, where in certain embodiments at least one host includes a device directory. For example, the host 100a may include the device directory 108a, the host 100b may include the device directory 108b, and the host 100n may include the device directory 108n. In certain embodiments, the device directories 108a . . . 108n are file directories and include references to device files corresponding to one or more of the plurality of devices 102a . . . 102m. In certain embodiments, the hosts 100a . . . 100n may be heterogeneous and run a plurality of operating systems.

The devices 102a . . . 102m may comprise any type of storage device known in the art, such as, a disk drive, a tape drive, a CDROM drive, etc. The devices 102a . . . 102m may comprise a heterogeneous group of storages devices that are capable of being accessed from the hosts 100a . . . 100n and the administrative server 106 via the SAN 104. In certain embodiments, the plurality of device 102a . . . 102m are shared among the plurality of hosts 100a . . . 100n.

The SAN 104 may comprise any storage area network known in the art. In certain embodiments, the SAN 104 may be coupled to any other network (not shown) known in the art, such as, the Internet, an intranet, a LAN, a WAN, etc.

A distributed application 110 is capable of running and interacting with software elements in one or more of the plurality of hosts 100a . . . 100n. The distributed application 110 may interact with or execute in one or more of the plurality of hosts 100a . . . 100n. In certain embodiments, the distributed application 110 may include any SAN application that uses a plurality of hosts and devices in the SAN 104. The distributed application 110 may include disaster recovery applications, data interchange applications, data vaulting application, data protection application, etc.

Since the distributed application 110 may have to interact with a plurality of heterogeneous devices 102a . . . 102m and heterogeneous host operating systems in the hosts 100a . . . 100n, the distributed application 110 may not be able to rely directly on a host operating system, a cluster manager, a logical volume manager, etc., to manage or allow the use of the devices 102a . . . 102m in the SAN 104. Additionally, when the devices 102a . . . 102m are shared among the hosts 100a . . . 100n, the host operating systems, cluster managers, etc., may not have the information needed to manage the devices 102a . . . 102m. Furthermore, it may be burdensome for an application vendor to engineer support that is customized for every combination of host operating system, host bus adapter driver, or storage device driver. Therefore, the management of the devices 102a . . . 102m may not be possible via the host operating systems, the cluster managers, the logical volume managers, etc., because of a lack of capability and because of the expense associated with creating support that is customized for a plurality of combinations of host operating systems, host bus adapter drivers, storage device drivers, etc.

FIG. 1 illustrates an embodiment, in which information related to the devices 102a . . . 102m is stored in the device directories 108a . . . 108n, where the device directories 108a . . . 108n are accessible to the distributed application 110. Additionally, the device directories 108a . . . 108n are implemented in a manner, such that, the device directories are operating system neutral and store information related to devices in a form that is suitable for interfacing with the distributed application 110. Certain embodiments may be implemented in computing environments in which the hosts 100a . . . 100n and the devices 102a . . . 102m are divided into clusters. The distributed application 110 may run over a cluster based operating system and use the device directories 108a . . . 108n for accessing the devices 102a . . . 102m.

Figure 2:
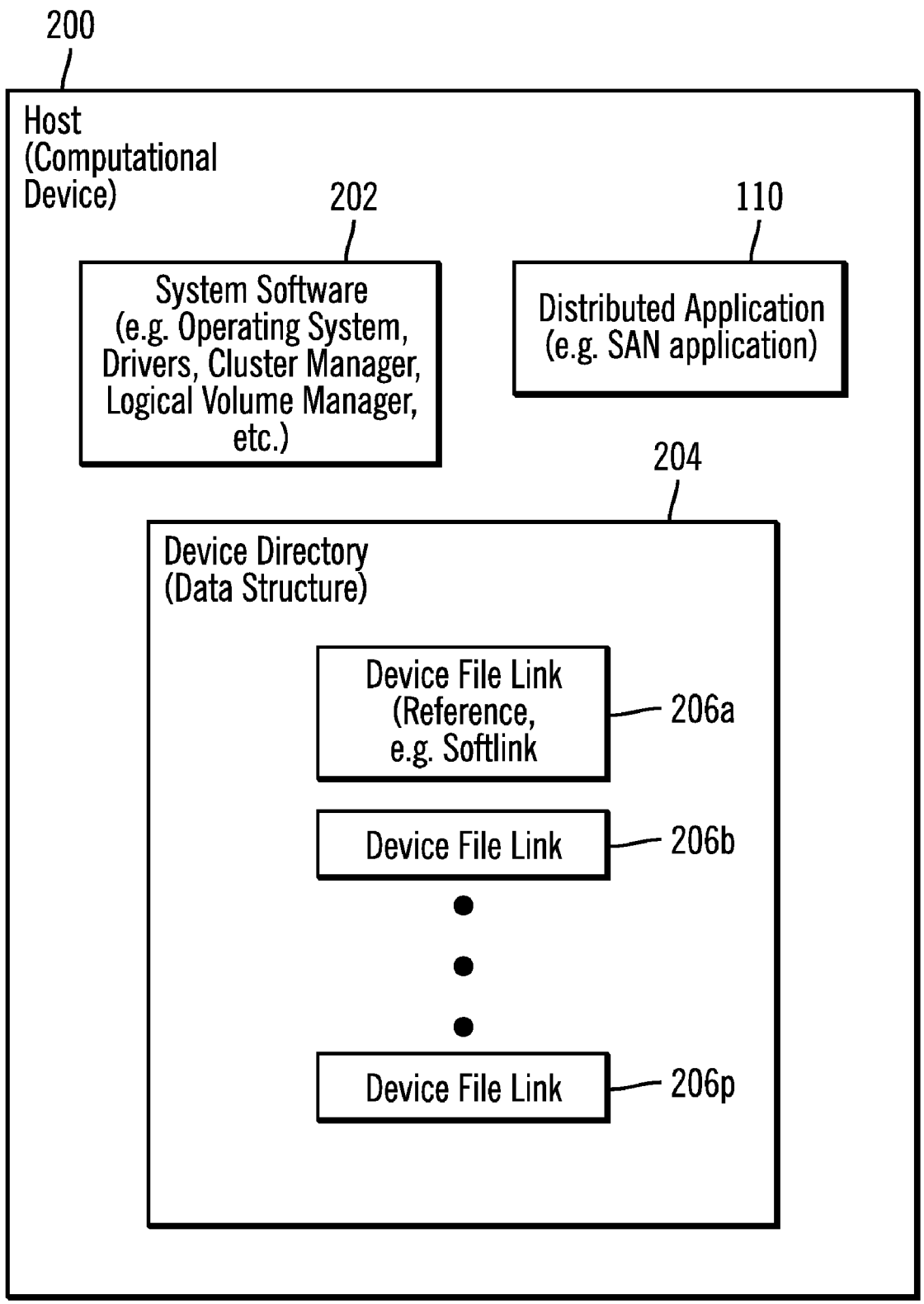
FIG. 2 illustrates a block diagram of a host that includes a device directory, in accordance with certain embodiments.

FIG. 2 illustrates a block diagram of a host 200, where the host 200 represents any of the hosts 100a . . . 100n. The host 200 includes system software 202, a device directory 204, and is capable of interacting with the distributed application 110, where in certain embodiments the distributed application 110 may be implemented in one or more hosts 100a . . . 100n. The system software 202 included in the host 200 may include the operating system of the host 200, various drivers that run in the host 200, cluster managers that run in the host 200, logical volume managers that run in the host 200, etc. The device directory 204 may represent any of the device directories 108a . . . 108n. For example, in certain embodiments if the host 200 represents the host 100a then the device directory 204 represents the device directory 108a.

The device directory 204 includes a plurality of device file links 206a . . . 206p, where the device file links 206a . . . 206p are references to device files corresponding to the devices 102a . . . 102m, where a device file may be used by the distributed application 110 to perform data transfer operations with respect to the device that corresponds to the device file. For example, in certain embodiments if a device file named "x" corresponds to the device 102m, then the device file link 206a may be a softlink to the device file "x". A softlink may indicate the location of the device file "x" in the SAN 104. For example, a softlink may be represented as "/dev/home/x", where the file named "x" is stored in the "home" directory of "dev", where "dev" may include any of the computational devices 100a . . . 100n, the administrative server 106, the devices 102a . . . 102m, or any other element capable of storing the file "x" that is coupled to the SAN 104. In certain embodiments, the device file resides on a host, such as, hosts 100a . . . 100n, and identifies a path or a set of possible paths through the SAN 104 to a storage device, such as storage devices 102a . . . 102n, where a storage device may include a virtual disk served by a storage server. In certain operating systems, the device file allows an application to use the corresponding device by opening, reading or writing to the device file. For example, by writing to a device file, an application, such as, the distributed application 110, writes through the driver and SAN 104 onto a storage device 102a . . . 102m. The application can also get certain information about the device, such as, the SAN address of the device, by executing operations against the corresponding device file. In certain embodiments, the link to a device file is an operating system facility in which a file, instead of being the actual device file, acts as the proxy of the device file. The application can open the link, and may perform operations on the link, similar to the operations on the device file the link points to. The application can also request the operating system to determine which device file the link points to.

In certain embodiments, the device directory 204 is a file directory that includes the device file links 206a. . . 206p. In alternative embodiments, the device directory 204 may be any data structure that is capable of storing references to the information related to the devices 102a . . . 102m. In certain embodiments, additional fields, such as, an identifier that associates a device file link to a particular device is included in the device directory 204.

In one embodiment, the distributed application 110 performs data transfer operations, such as, I/O operations, with respect to the devices 102a . . . 102m, by accessing the device files corresponding to the devices 102a . . . 102m via the device file links 206a . . . 206p that are stored in the device directory 204. In certain embodiments, the device directory 204 is created and populated with the device file links 206a . . . 206p, prior to an attempted usage of a device file link by the distributed application 110. Since the device directory 204 is stored locally in the host 200, the distributed application 110 may initiate data transfer operations with the devices 102a . . . 102m faster when compared to implementations in which references to the devices 102a . . . 102m are unavailable locally in the host 200. As the number of devices increase in the SAN 104 the time taken to search for a device 102a . . . 102m may increase significantly, if references to the devices 102a . . . 102m are not stored locally in the device directory 204. Furthermore, if there is an increase in the number of redundant paths in the SAN 104 then the number of device files to search through may also increase, causing an increase in the time taken to search for a device 102a . . . 102m.

Additionally, in certain embodiments the device directory 204 is operating system neutral, i.e., the device directory can be stored in the file system of a plurality of operating systems. When the device directory 204 is operating system neutral, the distributed application 110 can access the device directory 204 in embodiments in which the hosts 100a . . . 100n have heterogeneous operating systems.

Figure 3:
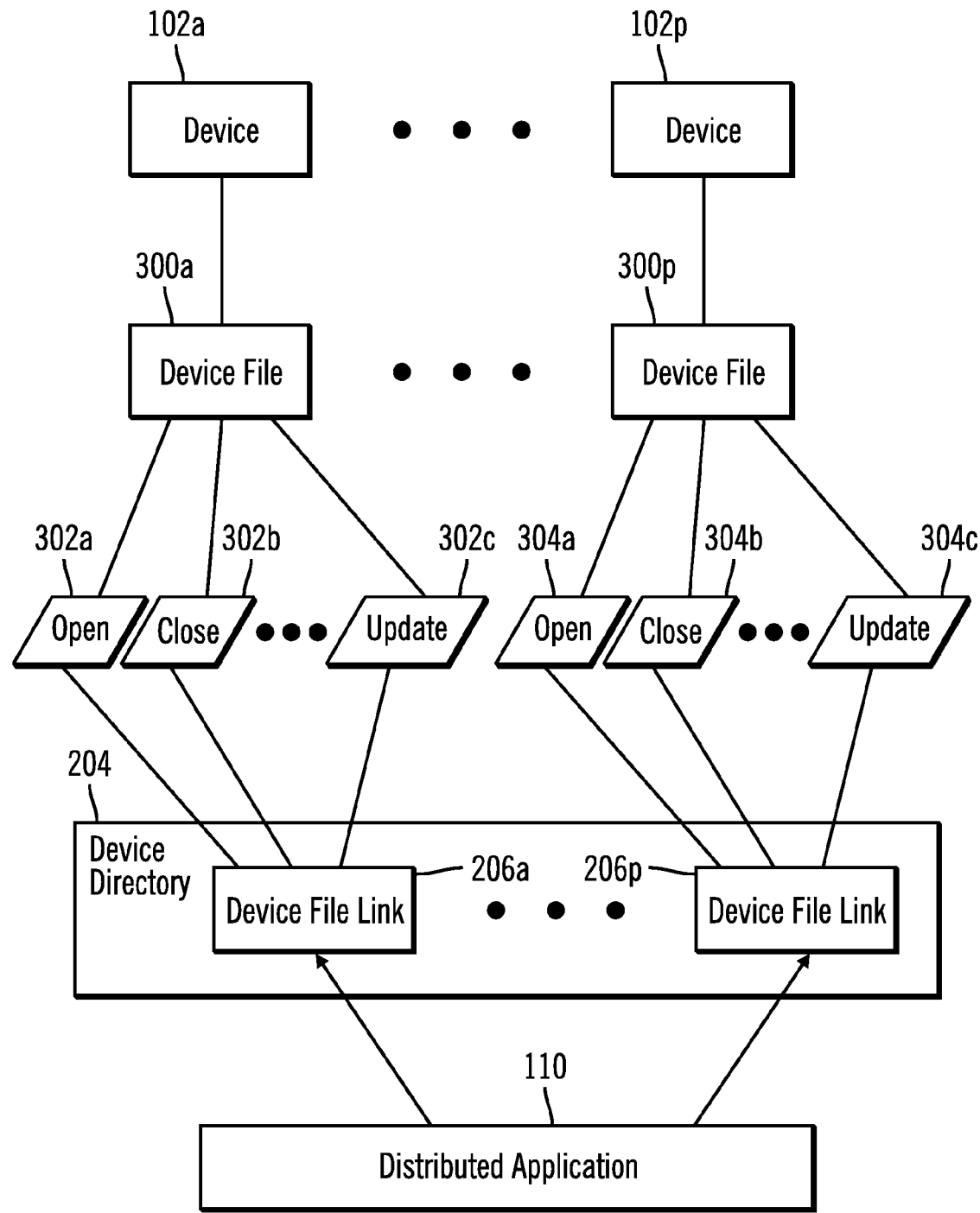
FIG. 3 illustrates a block diagram that illustrates how a distributed application uses the device directory to access a plurality of devices in a SAN, in accordance with certain embodiments.

FIG. 3 illustrates a block diagram that illustrates how the distributed application 110 uses the device directory 204 to access a plurality of devices in the SAN 104, in accordance with certain embodiments.

The distributed application 110 may need to perform data transfer operations with respect to a device. In certain embodiments, the distributed application 110 accesses the device file links 206a . . . 206p via the device directory 204 in the host 200. In certain embodiments, the device file links 206a. . 206p may reference device files 300a . . . 300p that correspond to the devices 102a . . . 102p. In certain embodiments, the devices 102a . . . 102p may be a subset of the devices 102a . . . 102m shown in FIG. 1. For example, the device file link 206a may reference the device file 300a, and the device file link 206p may reference the device file 300p. In certain embodiments, the device files 300a . . . 300p may represent either specific individual paths to a storage device 102a . . . 102p through the SAN 104, or a choice of paths to a storage device 102a . . . 102p. In certain embodiments the storage devices 102a . . . 102p may include a virtual storage device served by a storage server, such as, the IBM Enterprise Storage Server®.

In certain embodiments, the distributed application 110 determines a device file link, such as, device file link 206a, 206p. The distributed application 110 may perform various operations, such as, open 302a, 304a, close 302b, 304b, update 302c, 304c, read (not shown), write (not shown), append (not shown), etc., with respect to the device files 300a, 300p. For example, the distributed application 110 may use the device file link 206a to open 302a the device file 300a for initiating data transfer operations with the device 102a.

Therefore, FIG. 3 illustrates an embodiment in which the distributed application 110 accesses the devices 102a . . . 102p in the SAN 104 by using the device directory 204.

Figure 4:
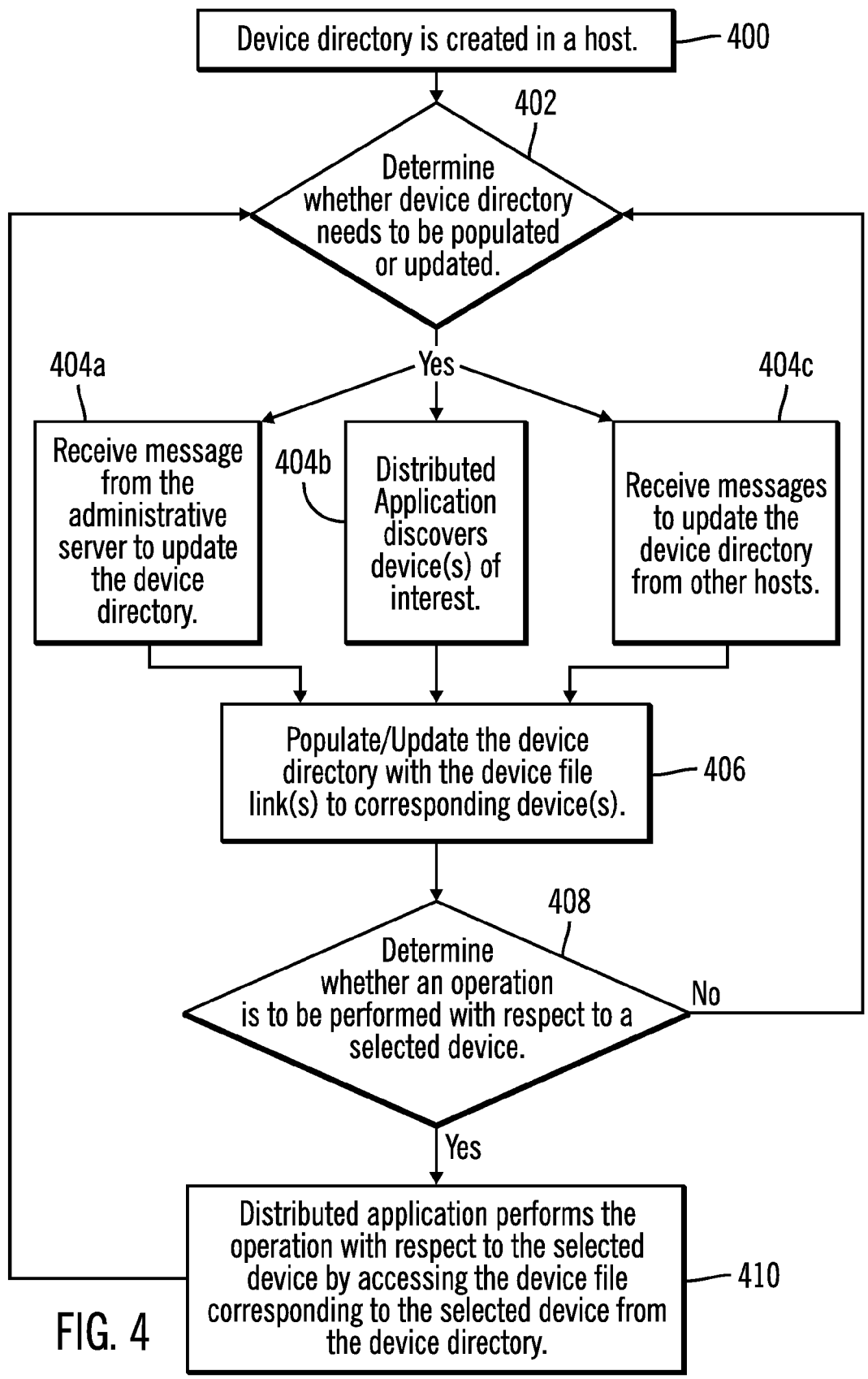
FIG. 4 illustrates operations for generating the device directory and performing Input/Output (I/O) operations with respect to devices in a SAN by using the device directory, in accordance with certain embodiments.

FIG. 4 illustrates operations for generating the device directory 204 and performing I/O operations with devices in a SAN 104 by using the device directory 204, in accordance with certain embodiments of the present invention. The operations described in FIG. 4 may be implemented in the computing environment illustrated in FIG. 1.

Control starts at block 400 where the device directory 204 is created in a host, such as, the host 200. The device directory 204 may represent any of the device directories 108a . . . 108n, and the host 200 may represent the corresponding host 100a . . . 100n. The creation of the device directory 204 in a host may be performed by the host or by the administrative server 106. In certain embodiments the distributed application 110 may create the device directory 204.

A determination is made (at block 402) as to whether the device directory 204 may need to be populated or updated with device file links, such as, device file links 206a . . . 206p. For example, the device directory 204 may need to be populated or updated if the device directory 204 is empty or a process in the host 200 requests access to a device that is absent in the device directory 204. In certain embodiments, the device directory 204 may need to be populated or updated at periodic intervals when device discovery needs to be performed or when other hosts or the administrative server 106 start sending messages that may include updates to the device directory 204. If the device directory needs to be populated or updated, then the device directory 204 may be populated or updated by the execution of the operations described in one or more of the blocks 404a, 404b, 404c and a subsequent execution of the operation described in block 406. In certain embodiments, the process may wait in block 402 until a determination is made that the device directory 204 may need to be updated or populated.

In certain embodiments, the distributed application 110 that executes in a host 200 may receive (at block 404a) a message from the administrative server 106 to populate or update the device directory 204. The distributed application 110 that executes in a host 200 may also discover (at block 404b) one or more devices 102a . . . 102m of interest in the SAN 104. The distributed application 110 that executes in a host 200 may also receive (at block 404c) one or more messages to populate or update the device directory 204 from the other hosts in the SAN 104. For example, in certain embodiments the host 100a that executes the distributed application 110 may receive a message from the host 100b to populate or update the device directory 108a. The message received by the host 100a may include information that enables the receiving host 100a to find the corresponding device of interest. For example, the information may include the World Wide Port Name of a device, where the receiving host 100a can use the World Wide Port Name of the device in association with a storage driver to find the device file of interest. Subsequently, a link can be created in the device directory 108a of the receiving host 100a to the corresponding device file.

The distributed application 110 may populate or update (at block 406) the device directory 204 with the device file links to the corresponding devices based on the messages received or device discovery performed in blocks 404a, 404b, 404c. For example, in certain embodiments, the distributed application 110 may populate or update the device directory 204 with the device file links 206a . . . 206p that references the device files 300a . . . 300p corresponding to the devices 102a . . . 102p. Therefore, in certain embodiments the populating and updating of the device directory 204 may be performed by the distributed application 110. In certain alternative embodiments, applications that are different from the distributed application 110 may populate or update the device directory.

The distributed application 110 determines (at block 408) whether an operation is to be performed with respect to a selected device. If so, the distributed application 110 performs (at block 410) the operation with respect to the selected device by accessing the device file corresponding the selected device from the device directory 204, and control returns to block 402 for populating or updating the device directory 204. For example, in certain embodiments, the distributed application 110 may perform an open 304a on the device file 300p corresponding to the device 102p by using the device file link 206p in the device directory 204.

If the distributed application 110 determines (at block 408) that no operation is to be performed with respect to the selected device then control returns to block 402 for populating or updating the device directory 204. In certain embodiments, the process described in blocks 402, 404a, 404b, 404c, 406, 408, and 410 may be executed repeatedly in the host 200. In other embodiments, an exception, an error condition, a shutdown, or a rebooting of the host 200 may terminate the process described in FIG. 4.

Therefore, FIG. 4 describes an embodiment in which a device directory 204 that includes references to device files 300a . . . 300p corresponding to devices 102a . . . 102p is created, populated and updated. The host in which the device directory 204 is located allows the distributed application 110 to perform operations with respect to the devices 102a . . . 102p by using the device directory 204. Since, the device directory 204 is stored locally in the host 200, the distributed application 110 can access a device faster in comparison to implementations in which the reference to the device is located remotely from the host 200. Therefore, in certain embodiments while the system software 202, such as, a host operating system, may manages the device files, the distributed application manages the device directory 204.

Figure 5:
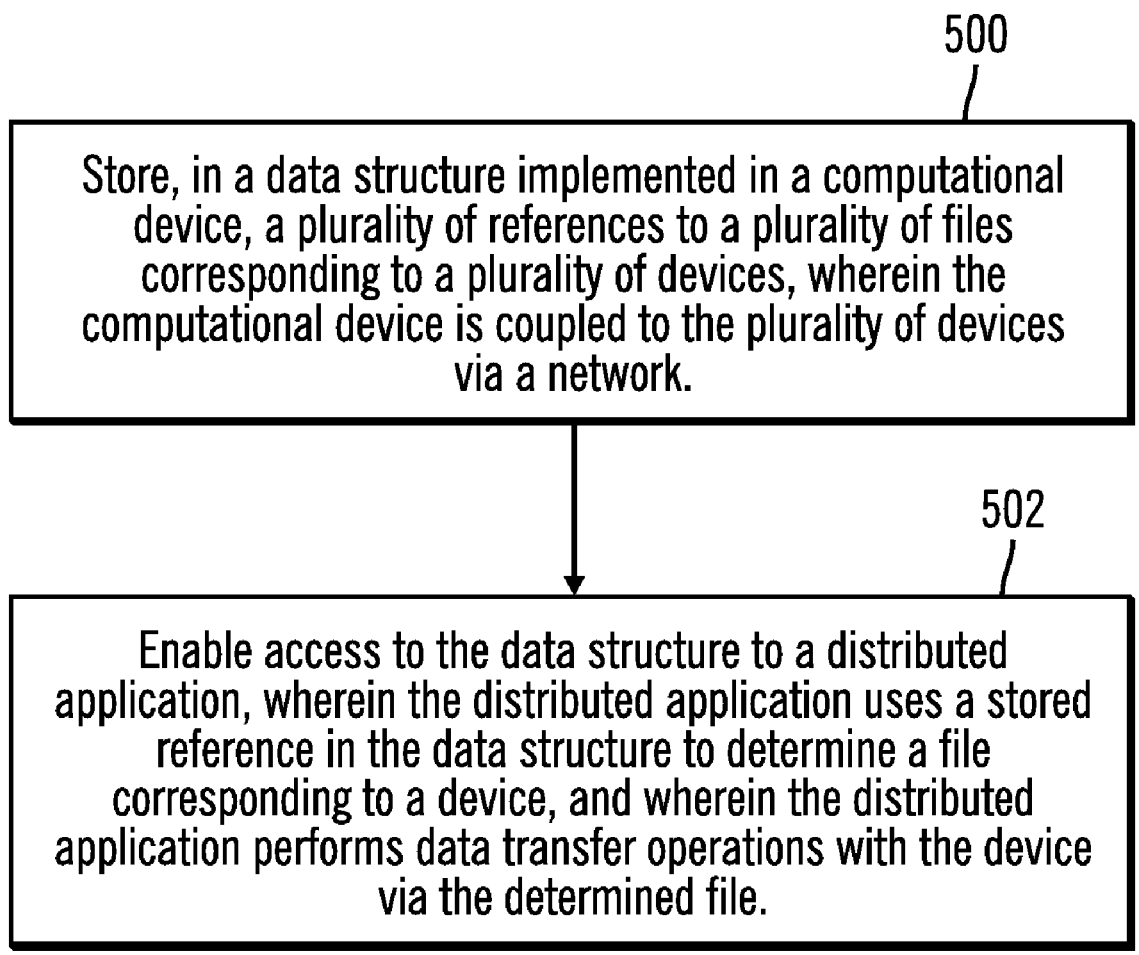
FIG. 5 illustrates operations implemented in a host for allowing a distributed application to use the device directory for performing I/O operations with respect to devices in a SAN, in accordance with certain embodiments.

FIG. 5 illustrates operations implemented in a host, such as host 200, for allowing the distributed application 110 to use the device directory 204 for performing I/O operations with respect to the devices 102a . . . 102m in the SAN 104, in accordance with certain embodiments.

Control starts at block 500, where the computational device 200 stores in a data structure 204 implemented in the computational device 200 a plurality of references 206a . . . 206p to a plurality of files 300a. . . 300p corresponding to a plurality of devices 100a . . . 100p, wherein the computational device 200 is coupled to the plurality of devices 100a . . . 100p via a network 104.

The computational device 200 enables (at block 502) access to the data structure 204 to a distributed application 110, wherein the distributed application 110 uses a stored reference in the data structure 204 to determine a file corresponding to a device, and wherein the distributed application 110 performs data transfer operations with the device via the determined file.

Therefore, FIG. 5 illustrates how a computational device, such as, the host 200, allows the distributed application 110 to use the device directory 204 for performing data transfer operations.

In certain embodiments, knowledge about devices in a SAN are cached locally in a host, such that, candidate or used devices are quickly accessible and visible to an administrator or a distributed application 110. In certain embodiments, a designated directory is used as a platform-independent, vendor-independent technique for managing devices shared by a distributed application across a plurality of hosts in a SAN environment, where the time and complexity to scan for suitable devices is reduced by storing the designated directory locally in a host. The designated directory may be updated with references to devices when the host is not performing critical operations, where the critical operations are operations that should be completed as soon as possible. In certain embodiments, the distributed application 110 caches information in the device directories 108a . . . 108n, where the cached information may be related to devices that may be accessed or devices that are already in use by the distributed application 110 or other applications. In certain embodiments, the location of the device directories 108a . . . 108n may be designated by the distributed application 110. In certain other embodiments, the device directories are not used by the any storage device vendor or by any host system software for storing general purpose device files. In certain alternative embodiments, an administrator may use the administrative server 106 to manually configure the device directories 108a . . . 108n. Automated scripts may also be run on the administrative server 106 to configure the device directories 108a . . . 108n. Additionally, in other embodiments administration can occur on the hosts 100 . . . 100n, in addition to the administrative server 106. For example, an administrator could log on to a selected host and add new links in the device directory 204 used by the distributed application 110 and indicate to the distributed application 110 the devices that are available for use by the distributed application 110 on the selected host.

In certain embodiments, the distributed application 110 is enabled to reduce the time needed to scan the devices 102a . . . 102m during critical operations. In certain other embodiments, the hosts 100a . . . 100n, the distributed application 110, or the administrative server 106 may create, populate, or update the device directories 108a . . . 108n by scanning the devices in the SAN 104 when critical operations are not being processed.

In certain embodiments, the distributed application 110 interacts with the devices 102a . . . 102m in a generic manner. In certain other embodiments, the distributed application 110 is able to use devices 102a . . . 102m that were not available at the time the distributed application was designed, tested, or documented. In alternative embodiments, additional operations beyond those described in FIGS. 1-5 may be used by the distributed application 110 to locate devices. For example, the distributed application 110 may search other device locations or may be customized to use or prefer certain vendor devices or drivers, or may interact with an operating system on a host to determine devices for data transfer. In certain embodiments, the devices 102a . . . 102m are labeled for use in the device directories without using the system software 202. Since the system software on each host of the plurality of hosts 100a . . . 100n may be different, labeling the devices 102a . . . 102m by the system software on each host may lead to conflicts and may interfere with the use of the devices 102a . . . 102n by the distributed application 110.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD- ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 6:
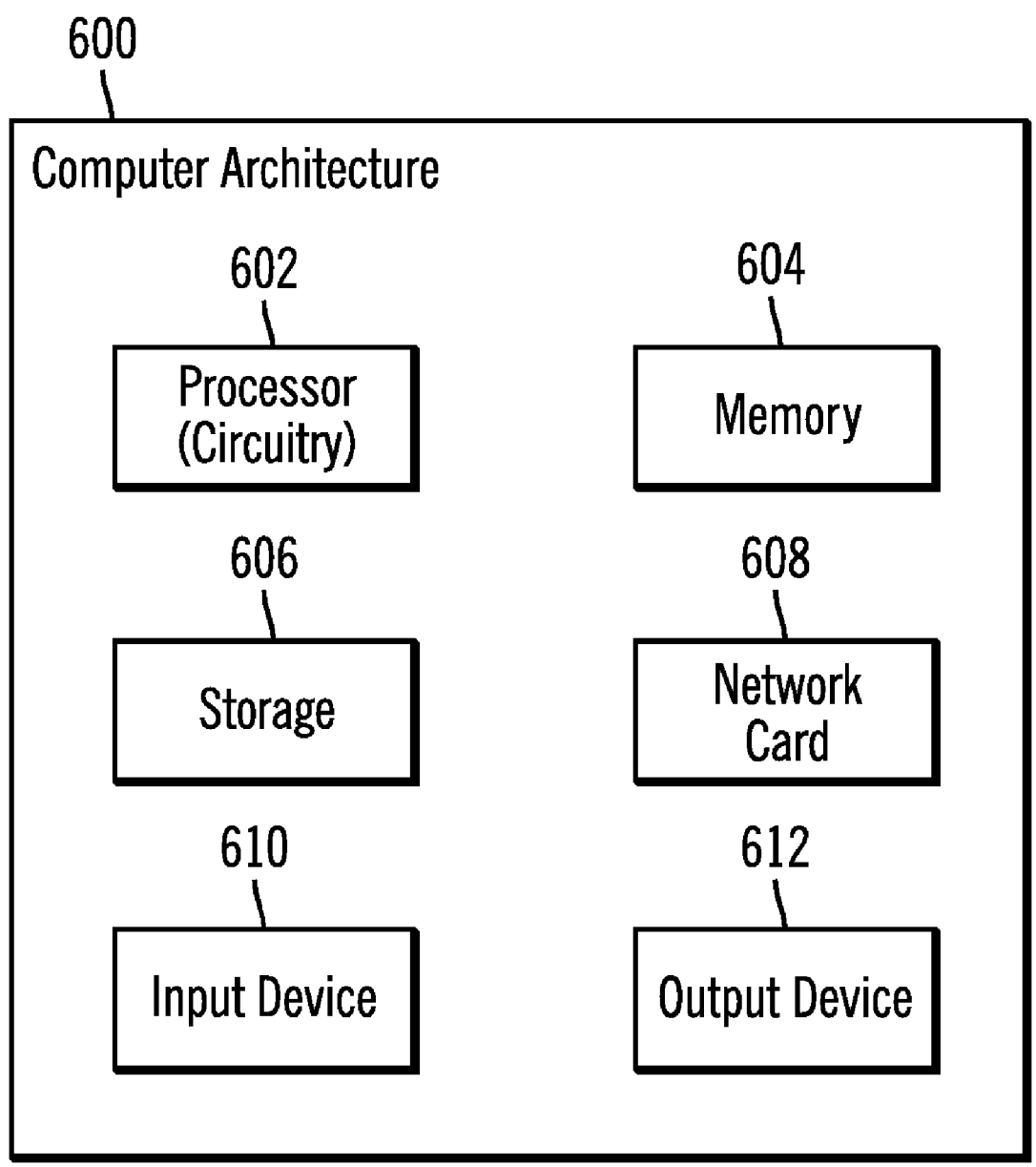
FIG. 6 illustrates a computing architecture in which certain embodiments are implemented.

FIG. 6 illustrates a block diagram of a computer architecture 600 in which certain embodiments may be implemented. In certain embodiments, the hosts 100a . . . 100n and the administrative server 106 may be implemented according to the computer architecture 600. The computer architecture 600 may include a processor or a circuitry 602, a memory 604 (e.g., a volatile memory device), and storage 606. Certain elements of the computer architecture 600 may or may not be found in the hosts 100a . . . 100n and the administrative server 106. The storage 606 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 606 may comprise an internal storage device, an attached storage device and/or a network accessible storage device. Programs in the storage 606 may be loaded into the memory 604 and executed by the processor 602. In certain embodiments, the circuitry 602 may be in communication with the memory 604, and the circuitry 602 may be capable of performing operations. Additionally, the architecture may include a network card 608 to enable communication with a network, such as the storage area network 104. The architecture may also include at least one input device 610, such as, a keyboard, a touchscreen, a pen, voice-activated input, etc., and at least one output device 612, such as a display device, a speaker, a printer, etc.

At least certain of the operations of FIGS. 4 and 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

IBM, ESCON, and Enterprise Storage Server are registered trademarks or trademarks of IBM corporation.

What is claimed is:

1. A computer readable storage medium storing code, wherein a computational device is coupled to a plurality of storage devices by a network, and wherein the code when executed causes operations, the operations comprising:

storing, in a data structure implemented locally in the computational device, a plurality of references to a plurality of files corresponding to the plurality of storage devices, wherein the plurality of storage devices are divided into clusters; and accessing the data structure by a distributed application that executes over a cluster based operating system, wherein the distributed application uses a stored reference in the data structure to determine a file corresponding to a storage device included in the plurality of storage devices, wherein the distributed application performs data transfer operations with the storage device via the determined file, wherein the distributed application is configured to initiate the data transfer operations with the storage device faster by accessing the data structure implemented locally in the computational device in comparison to accessing the data structure implemented remotely from the computational device, wherein the distributed application is enabled to reduce a period of time needed to scan the plurality of devices during critical operations by scanning the plurality of devices when the critical operations are not being processed, and wherein the distributed application updates the data structure in response to receiving a message that includes a network location identifier of the storage device from another computational device, wherein the data structure is a device directory that is managed by the distributed application, wherein the files are device files, and wherein the device directory interacts with the device files that are managed by the cluster based operating system, and wherein an administrator logs on to an administrative server and adds new links to new devices in the device directory to indicate to the distributed application that the new devices are available for use by the distributed application.

2. The computer readable storage medium of claim 1, wherein the references are soft links to the device files.

3. The computer readable storage medium of claim 1, wherein the computational device is coupled to another computational device via the network, and wherein an additional storage device is added to the network, the operations further comprising:

receiving, from the another computational device, information for determining an additional reference that corresponds to an additional file corresponding to the additional storage device added to the network; and updating the data structure to include the additional reference.

4. The computer readable storage medium of claim 1, wherein an additional storage device is added to the network, the operations further comprising:

discovering the additional storage device;

determining an additional reference that corresponds to an additional file corresponding to the additional storage device; and updating the data structure to include the additional reference.

5. A method, comprising:
storing, in a data structure implemented locally in a computational device, a plurality of references to a plurality of files corresponding to a plurality of storage devices that are coupled to the computational device by a network, wherein the plurality of storage devices are divided into clusters; and
accessing the data structure by a distributed application that executes over a cluster based operating system, wherein the distributed application uses a stored reference in the data structure to determine a file corresponding to a storage device included in the plurality of storage devices, wherein the distributed application performs data transfer operations with the storage device via the determined file, wherein the distributed application is configured to initiate the data transfer operations with the storage device faster by accessing the data structure implemented locally in the computational device in comparison to accessing the data structure implemented remotely from the computational device, wherein the distributed application is enabled to reduce a period of time needed to scan the plurality of devices during critical operations by scanning the plurality of devices when the critical operations are not being processed, and wherein the distributed application updates the data structure in response to receiving a message that includes a network location identifier of the storage device from another computational device,
wherein the data structure is a device directory that is managed by the distributed application, wherein the files are device files, and wherein the device directory interacts with the device files that are managed by the cluster based operating system, and
wherein an administrator logs on to an administrative server and adds new links to new devices in the device directory to indicate to the distributed application that the new devices are available for use by the distributed application.

6. The method of claim 5, wherein the references are soft links to the device files.

7. The method of claim 5, wherein the computational device is coupled to another computational device via the network, and wherein an additional storage device is added to the network, the operations further comprising:
receiving, from the another computational device, information for determining an additional reference that corresponds to an additional file corresponding to the additional storage device added to the network; and
updating the data structure to include the additional reference.

8. The method of claim 5, wherein an additional storage device is added to the network, the operations further comprising:
discovering the additional storage device;
determining an additional reference that corresponds to an additional file corresponding to the additional storage device; and
updating the data structure to include the additional reference.

9. A system, wherein the system is configured to be in communication with a plurality of storage devices and a distributed application over a network, the system comprising:
a computational device;
a memory coupled to the computational device, and
circuitry in communication with the memory, wherein the circuitry is configured to perform operations, the operations comprising:
storing, in a data structure implemented locally in the computational device, a plurality of references to a plurality of files corresponding to the plurality of storage devices that are coupled to the computational device over the network, wherein the plurality of storage devices are divided into clusters; and
accessing the data structure by a distributed application that executes over a cluster based operating system, wherein the distributed application uses a stored reference in the data structure to determine a file corresponding to a storage device included in the plurality of storage devices, wherein the distributed application performs data transfer operations with the storage device via the determined file, wherein the distributed application is configured to initiate the data transfer operations with the storage device faster by accessing the data structure implemented locally in the computational device in comparison to accessing the data structure implemented remotely from the computational device, wherein the distributed application is enabled to reduce a period of time needed to scan the plurality of devices during critical operations by scanning the plurality of devices when the critical operations are not being processed, and wherein the distributed application updates the data structure in response to receiving a message that includes a network location identifier of the storage device from another computational device,
wherein the data structure is a device directory that is managed by the distributed application, wherein the files are device files, and wherein the device directory interacts with the device files that are managed by the cluster based operating system, and
wherein an administrator logs on to an administrative server and adds new links to new devices in the device directory to indicate to the distributed application that the new devices are available for use by the distributed application.

10. The system of claim 9, wherein the references are soft links to the device files.

11. The system of claim 9, wherein the computational device is coupled to another computational device via the network, and wherein an additional storage device is added to the network, the operations further comprising:
receiving, from the another computational device, information for determining an additional reference that corresponds to an additional file corresponding to the additional storage device added to the network; and
updating the data structure to include the additional reference.

12. The system of claim 9, wherein an additional storage device is added to the network, the operations further comprising:
discovering the additional storage device;
determining an additional reference that corresponds to an additional file corresponding to the additional storage device; and
updating the data structure to include the additional reference.

* * * * *